United States Patent
Mentink

(10) Patent No.: US 11,112,048 B2
(45) Date of Patent: Sep. 7, 2021

(54) CONNECTOR FITTING FOR A FLUID HOSE IN A VEHICLE AND CONNECTOR SYSTEM

(71) Applicant: Kongsberg Actuation Systems II, Inc., Suffield, CT (US)

(72) Inventor: Laurentius Andreas Gerardus Mentink, Haaksbergen (NL)

(73) Assignee: Kongsberg Actuation Systems II, Inc., Suffield, CT (US)

( * ) Notice: Subject to any disclaimer, the term of this patent is extended or adjusted under 35 U.S.C. 154(b) by 237 days.

(21) Appl. No.: 16/085,879

(22) PCT Filed: Mar. 17, 2016

(86) PCT No.: PCT/US2016/022850
§ 371 (c)(1),
(2) Date: Sep. 17, 2018

(87) PCT Pub. No.: WO2017/160292
PCT Pub. Date: Sep. 21, 2017

(65) Prior Publication Data
US 2019/0093811 A1    Mar. 28, 2019

(51) Int. Cl.
*F16L 41/12* (2006.01)
*F16L 41/08* (2006.01)

(52) U.S. Cl.
CPC ............. *F16L 41/12* (2013.01); *F16L 41/086* (2013.01)

(58) Field of Classification Search
CPC .................................. F16L 41/12; F16L 41/086
(Continued)

(56) References Cited

U.S. PATENT DOCUMENTS 2,640,672 A * 6/1953 Bedford, Jr. .............. F16L 5/00
248/239
3,231,300 A * 1/1966 Moroney ................ E05B 77/00
403/163
(Continued)

FOREIGN PATENT DOCUMENTS

EP      0668465 A2      8/1995
FR      3020454 A1 * 10/2015 ............. G01K 13/02
(Continued)

OTHER PUBLICATIONS

International Search Report for International Patent Application No. PCT/US2016/022850 dated Jan 2, 2017; 3 pages.
(Continued)

*Primary Examiner* — James M Hewitt, II
(74) *Attorney, Agent, or Firm* — Howard & Howard Attorneys PLLC

(57) ABSTRACT

A connector fitting for a fluid hose in a vehicle comprises a first end connectable to the hose, a second end connectable to parts of a fluid system and a cylindrical middle portion positioned between the first end and the second end. The middle portion comprises a shoulder extending in circumferential direction of the middle portion and is adapted to contact a first surface of a fixing plate when inner walls of a through-going recess of the fixing plate circumferentially surround the middle portion of the connector fitting. The connector fitting further comprises at least one snap-in tongue with a nib. The nib is adapted to engage a second surface of the fixing plate positioned parallel to the first surface such that the fixing plate is fixed in the longitudinal direction of the middle portion between shoulder and the nib.

19 Claims, 4 Drawing Sheets

(58) Field of Classification Search
USPC .................................. 285/414, 194, 205
See application file for complete search history.

(56) References Cited

U.S. PATENT DOCUMENTS

| | | | | |
|---|---|---|---|---|
| 4,243,835 A | * | 1/1981 | Ehrenfels ............... | H02G 3/185 |
| | | | | 165/135 |
| 4,462,620 A | | 7/1984 | Bambenek et al. | |
| 4,482,172 A | * | 11/1984 | DeVera ................... | F16L 39/00 |
| | | | | 285/140.1 |
| 4,762,343 A | * | 8/1988 | Hirohata .................. | F16L 5/12 |
| | | | | 285/140.1 |
| 5,096,232 A | * | 3/1992 | Fond ....................... | F16L 41/14 |
| | | | | 285/55 |
| 5,810,272 A | * | 9/1998 | Wallace ................ | B65H 55/046 |
| | | | | 242/137.1 |
| 2018/0087646 A1 | * | 3/2018 | Matsumoto ........... | F16L 37/008 |

FOREIGN PATENT DOCUMENTS

| | | | | |
|---|---|---|---|---|
| WO | WO-0165165 A1 | * | 9/2001 | ............ F16L 41/086 |
| WO | 2010066763 A1 | | 6/2010 | |

OTHER PUBLICATIONS

English language abstract, and machine-assisted English language translation of International Publication No. WO 2010/066763 A1 extracted from www.espacenet.com on Jul. 20, 2018; 11 pages.

* cited by examiner

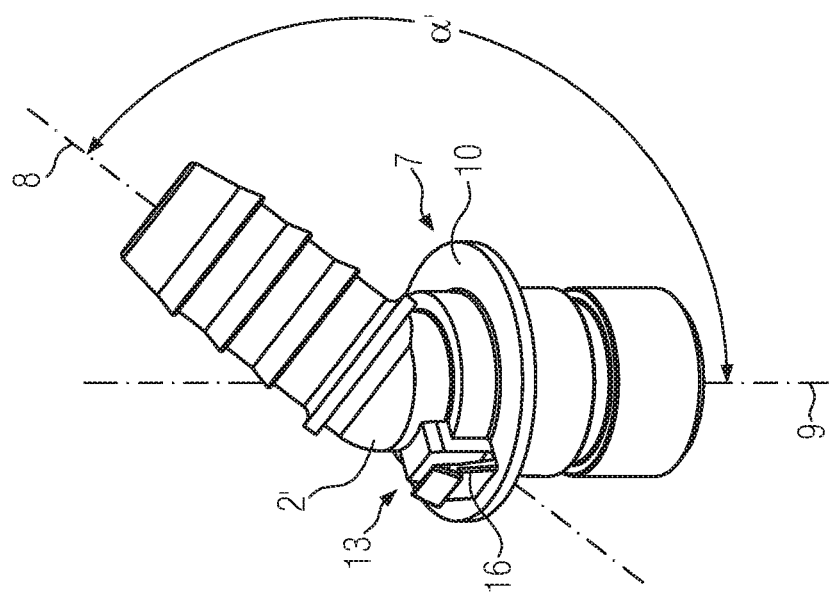
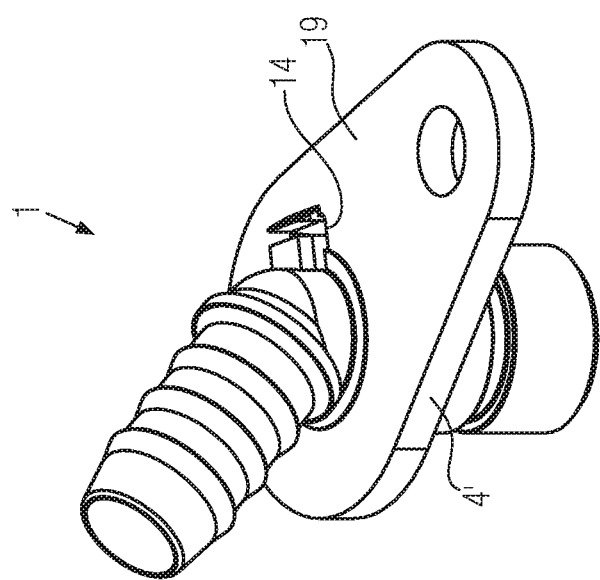

CONNECTOR FITTING FOR A FLUID HOSE IN A VEHICLE AND CONNECTOR SYSTEM

CROSS-REFERENCE TO RELATED APPLICATIONS

The present application is the National Stage of International Patent Application No. PCT/US2016/022850, filed on Mar. 17, 2016, which is hereby expressly incorporated herein by reference in its entirety.

BACKGROUND OF THE INVENTION

1. Field of the Invention

The present invention relates to a connector fitting for a fluid hose in a vehicle.

2. Background of the Invention

Connector fittings are used in cars and trucks e.g. for the connection of a fluid hose to a fuel filter of a vehicle's fuel system. In order to fix a connector fitting properly it is attached to an engine or vehicle part using a fixing plate. During the assembly this fixing plate has to be brought into contact with the shoulder of the connector fitting, the fixing plate having the correct orientation relative to the connector fitting. Both parts are then together fixed to the engine or vehicle part. During assembly the fixing plate may slip or till relative to the connector fitting and has to be brought into its correct position again. This results in a rather time consuming assembly process.

It is therefore an object of the present invention to provide a connector fitting for a fluid hose which simplifies the assembly process.

This object is achieved by a connector fitting as described herein.

SUMMARY OF THE INVENTION

According to the present invention the connector fitting comprises at least one snap-in tongue with a nib. The nib is adapted to engage with a second surface of the fixing plate positioned parallel to the first surface such that the fixing plate is fixed in the longitudinal direction of the middle portion between the shoulder and the nib of the snap-in tongue. Preferably the snap-in tongue is connected to the shoulder and is oriented parallel to the longitudinal direction of the middle portion. Preferably the nib is positioned at the upper end of the snap-in tongue and comprises a sliding surface on its top. It is understood that the middle portion may have any geometrical shape such as a cylindrical, an oval, an octagon or a star-shape.

In connection with the present invention it has been found out that preassembling the connector fitting and the fixing plate such that both parts are fixed to each other prior to their attachment to an engine or vehicle part shortens the overall assembly time as the fixing plate stays connected to the connector fitting during their later attachment.

In a preferred embodiment the middle portion comprises a protrusion which extends perpendicular to the longitudinal direction of the middle portion and is positioned adjacent to the shoulder. The protrusion is adapted to engage with a corresponding notch in the through-going recess of the fixing plate to rotationally fix the fixing plate relatively to the connector fitting. This also contributes to the simplification of the assembly process as the orientation of the fixing plate relatively to the connector fitting is fixed when the fixing plate is in contact with the shoulder of the connector fitting. A slipping of the fixing plate relative to the connector fitting is omitted. Preferably the connector fitting, the fixing plate and the hose attached to the first end of the connector fitting are preassembled and can be mounted directly to an engine or vehicle part without further assembly steps.

In an alternative arrangement the protrusion comprises a rigid body being fixed to the middle portion wherein the snap-in tongue is arranged in a direction perpendicular to the longitudinal direction of the middle portion further outward than the rigid body and is adapted to flex towards the rigid body. Preferably there is a U-shaped gap between the rigid body and the snap-in tongue. This gap enables the snap-in tongue to flex towards the rigid body.

In a preferred embodiment the snap-in tongue is aligned with the rigid body in a direction perpendicular to the longitudinal direction of the middle portion. By that the rigid body as well as the snap-in tongue come into contact with the inner walls of the notch of the fixing plate. By contacting the inner walls of the notch the snap-in tongue contributes to the rotational fixation of the fixing plate relative to the connector fitting.

Advantageously the connector fitting comprises two snap-in tongues each comprising a nib. This provides a strong fixation of the fixing plate to the connector fitting.

Preferably the two snap-in tongues are located opposite to each other along the circumferential direction of the middle portion. This causes a uniform contact of the fixing plate on the shoulder in circumferential direction. Tilting of the fixing plate relative to the connector fitting is thereby prevented.

In an alternative embodiment the first end extends along a first longitudinal axis which differs from a second longitudinal axis of the middle portion, wherein the first longitudinal axis and the second longitudinal axis enclose an angle of 70° to 150°, preferably of 80° to 145°, more preferably of 90° or 135°. As the first end is angled relatively to the second end the connector fitting facilitates a space saving arrangement of the fluid hose. Different connector fittings with different angels allow different hose routing options under consideration of adjacent vehicle parts.

In a preferred embodiment the snap-in tongue comprises a first section and a second section, wherein the first section extends from the first end parallel to the first longitudinal axis and the second section extends from the first section towards the shoulder of the middle portion. Preferably the first section and the second section enclose an angle of 110° to 190°. preferably of 150° to 170°, more preferably of 160°. Preferably the angle between the first and the second section is larger than the angle between the first and the second longitudinal axes. By that the second section of the snap-in tongue extends towards the shoulder in a distance of the middle portion.

In a preferred embodiment the second section forms a flexible end adapted to flex towards the middle portion. The second section may comprise a sliding surface on its upper side.

Advantageously the flexible end comprises a contact area, which is adapted to engage with the notch of the fixing plate and the nib located adjacent to the contact area w herein the nib is adapted to engage with the second surface of a fixing plate when the contact area is engaged with the notch. Preferably the contact area ensures the correct position of the nib relative to the second surface of the fixing plate by coming into contact with an inner wall of the notch. The underside of the nib and the contact area may enclose an angle of about 80° to 90°, preferably 80°, to facilitate an easy snap-in and snap-out of the fixing plate. Additionally such an angel ensures a securely fixation of the fixing plate.

In an alternative arrangement the connector filling is injection molded using a mold which comprises two halves with a mold parting line in between, wherein the snap-in tongue is arranged in such a manner that the mold parting line forms a symmetry plane for the snap-in longue. Preferably the symmetry plane extends along the longitudinal direction of the middle portion. The demolding of the connector fitting is achieved by moving the two halves in opposite directions perpendicular to the mold parting line. The above mentioned arrangement of the snap-in tongues therefore simplifies the production process of the connector fitting as there are no undercuts which would interfere the demolding. Additional moving parts in the mold to demold undercuts are not necessary.

In a preferred embodiment the middle portion is cylindrical. In this case the protrusion extends radially from the middle portion. Preferable the snap-in longue is positioned in a radial direction further outward than the rigid body of the protrusion. Optionally the snap-in tongue is radially aligned with the rigid body.

The object of the present invention is also achieved by a connector system comprising a connector fitting according to the present invention and a fixing plate to fix the connector fitting to an engine part of a vehicle part. It is understood that the through-going recess of the fixing plate may have any geometrical form such as an oval or an octagon or a starshaped form.

Preferably the fixing plate comprises a through-going recess formed as a bore (through-hole) which receives the connector fitting when the fixing plate is put over the first end of the connector filling, such that the fixing plate comes in contact with the sliding surface of the snap-in tongue. By pushing the fixing plate towards the shoulder the fixing plate slides along the sliding surface thus bending the snap-in tongue towards the rigid body of the protrusion. After having passed the nib the fixing plate comes into contact with the shoulder and the snap-in tongue flexes back in a vertical position. In this position the nib engages with the second surface of the fixing plate such that the underside of the nib contacts the second surface of the fixing plate. The snap-in tongue is dimensioned in such a manner, that its bending follow ed by the engagement of the nib with the fixing plate can be done manually. Preferably the connector fitting is made out of synthetic material such as plastic using injection molding whereas the fixing plate consists out of metal. Advantageously the fixing plate is a low cost stamped steel-plate. It is understood that the connector fitting and the fixing plate may also consist out of the same material such as plastic or metal. For example both parts may be formed by injection molding.

In a preferred embodiment the fixing plate comprises a through-going recess formed as a bore which receives the middle portion of the connector fitting. The bore can be manufactured easily.

Advantageously the through-going recess corresponds in its form to an outer shape of the middle portion. This simplifies the assembly as the fixing plate can be put over the connector fitting more easily. If the middle portion and the recess comprise for example an oval, octagon or star shape a rotation of both parts relative to each other is prevented thereby supporting the protrusion of the connector fitting in its anti turning function.

BRIEF DESCRIPTION OF THE DRAWINGS

The invention will be described in the following in connection with various examples of preferred arrangements in the drawings.

FIGS. 3a and 3b show perspective views of a connector system with a second embodiment of the connector fitting in detail.

DETAILED DESCRIPTION OF THE INVENTION

Figure 1:
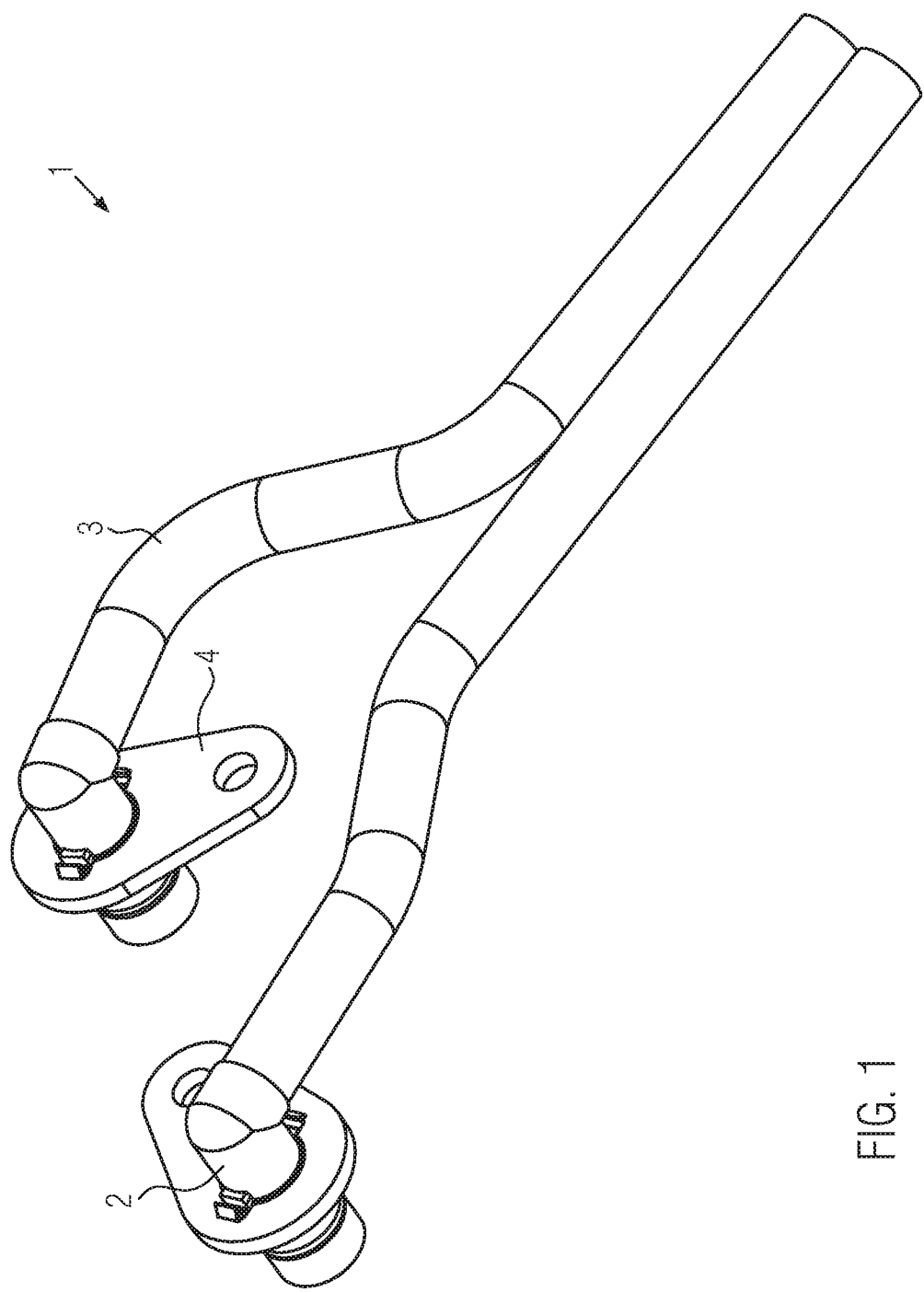
FIG. 1 shows a perspective view of a connector system according to the present invention.

In FIG. 1 a perspective view of a connector system 1 is shown which comprises a connector fitting 2 connected to a fluid hose 3 and a fixing plate 4 for fixing the connector fitting to an engine part or a vehicle part (not shown).

Figure 2B:
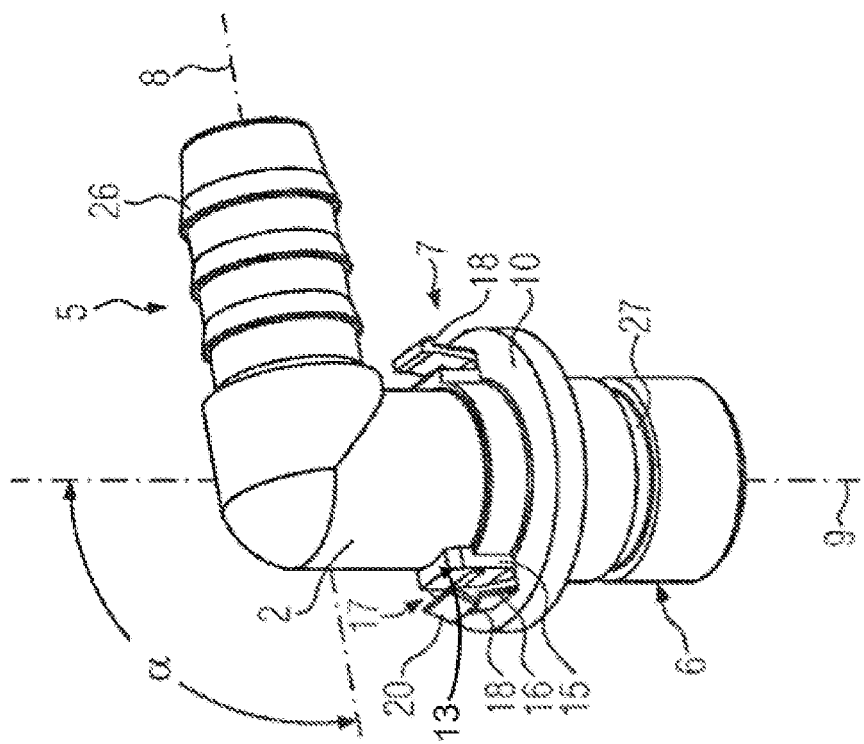
FIGS. 2a and 2b show perspective views of the connector system according to FIG. 1 and a connector fitting in detail.
Figure 2A:
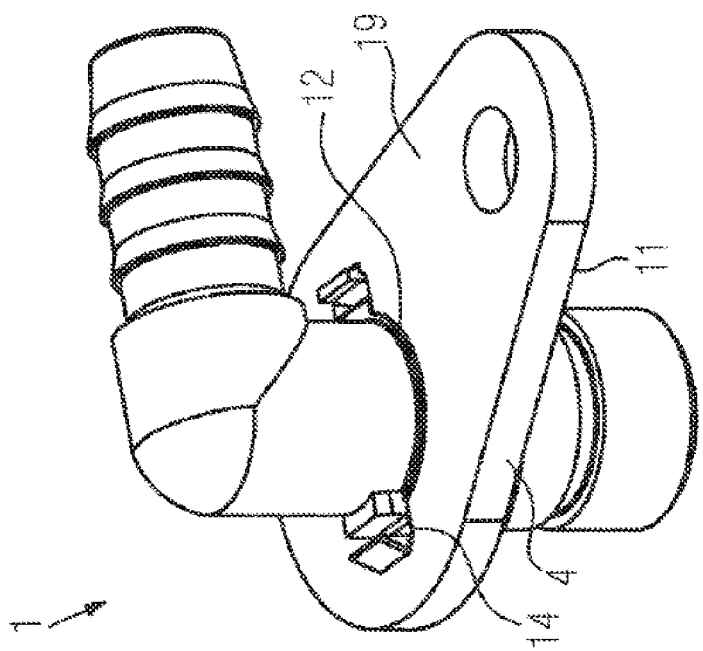

FIGS. 2a and 2b show the connector system 1 and the connector fitting 2 more detailed. The connector fitting 2 comprises a first end 5 which is connectable to the fluid hose 3 (see FIG. 1) and a second end 6 which is connectable to parts of a fluid system (not shown).

The first end 5 has a fir tree design on its outer side with three barb shaped expansions 26 extending circumferentially around the first end 5 and being located along a longitudinal direction of the first end 5. It is understood that the invention is not limited to a fir tree design. Every design which hinders the hose 3 to slip off the first end 5 is suitable.

The second end 6 comprises a groove 27 which extends in a circumferential direction of the second end 6. The groove 27 is adapted to receive an elastic seal ring, preferably an O-Ring (not shown). It is understood that the second end 6 may comprise more than one groove 27, for example two grooves located along a longitudinal direction of the second end 6.

The connector fitting 2 further comprises a cylindrical middle portion 7 which is positioned in between the first end 5 and the second end 6. While the first end 5 extends along a first longitudinal axis 8, the middle portion 7 extends along a second longitudinal axis 9. Both axes 8. 9 enclose an angle a of 90°. It shall be understood that the invention is not limited to an angle a of 90°. Other angles for example 120°, 135°, 160° or 180° are also a possible.

The middle portion 7 comprises a shoulder 10 which extends in circumferential direction of the middle portion 7. The shoulder 10 is adapted to come into contact with a first surface 11 of the fixing plate 4 when said fixing plate 4 is positioned in such a manner that inner walls of a through-going recess of the fixing plate 4 formed as bore 12 circumferentially surround the middle portion 7 of the connector fitting 2.

The middle portion 7 further comprises two radially extending protrusions 13 positioned adjacent to the shoulder 10. The protrusions 13 are located opposite to each other. The protrusions 13 are adapted to engage with corresponding notches 14 in the bore 12 of the fixing plate 4 to rotationally fix the fixing plate 4 relative to the connector fitting 2.

Each protrusion 13 comprises a rigid body 15 being fixed to the middle portion 7. In a radial direction further outward than the rigid body 15 there is a snap-in tongue 16 extending vertically from the shoulder 10 and being radially aligned with the rigid body 15. Between the rigid body 15 and the snap-in tongue 16 exists a U-shaped gap 17 which enables the snap-in tongue 16 to flex towards the rigid body 15.

Each snap-in tongue 16 comprises a nib 18 which is adapted to engage with a second surface 19 of the fixing plate 4 positioned parallel to the first surface 11 such that the fixing plate 4 is fixed in the longitudinal direction of the middle portion 7 between the shoulder 10 and the nib 18 of the snap-in tongue 16.

Each snap-in longue 16 comprises a sliding surface 20 on its top on which the radial outward positioned inner walls of the notches 14 slide along in order to mount the fixing plate 4 onto the connector fitting 2.

In connection with the present invention it has been found out that the design of the snap-in tongues 16 according to the embodiment of the connector fitting 2 in FIGS. 2*a* and 2*b* works best with a thickness of a fixing plate 4 between 1 mm and 6 mm. preferably 3 mm to 5 mm. As the vertical distance between the shoulder 10 and the underside of the nib 18 corresponds to the desired thickness of the fixing plate 4 it has been found out that the flex of the snap-in tongue 16 under regard of the above mentioned values facilitates an easy snap in and snap out of the fixing plate 4 without damaging the snap-in tongue 16.

FIGS. 3*a* and 3*b* show a second embodiment of the connector fitting 2. The connector fitting 2' differs from the one shown in FIGS. 2*a*. 2*b* in the number of protrusions 13 and number of snap-in tongues 16. The connector fitting 2' comprises only one protrusion 13 which is connected to the middle portion 7 and is positioned adjacent to the shoulder 10. Moreover there is only one snap-in tongue 16 extending vertically from the shoulder 10. Corresponding to the single protrusion 13 and the single snap-in tongue 16 the fixing plate 4' comprises only one notch 14.

Additionally the connector fitting 2' further differs from the one in FIGS. 2*a* 2*b* in the angle a' between the first longitudinal axis 8 and the second longitudinal axis 9. Tire angle a' is 135°. It shall be understood that the invention is not limited to an angle a' of 135°. Other angles for example 90°, 120°, 160° or 180° are also possible.

Figure 4B:
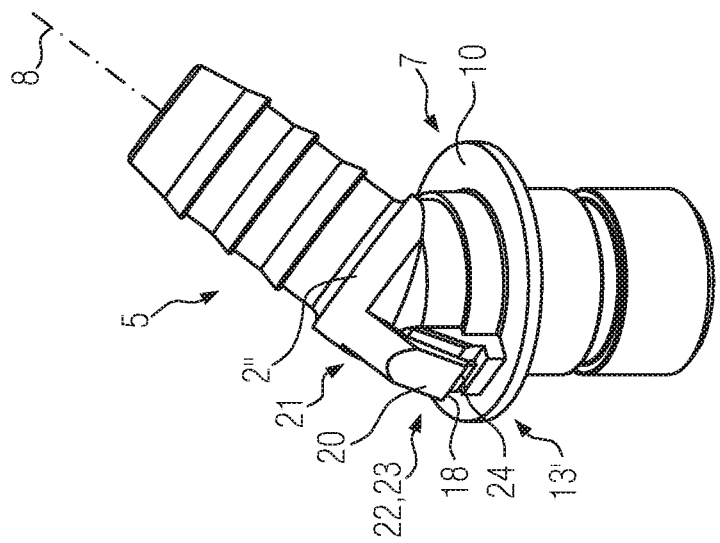
FIGS. 4a and 4b show perspective views of a connector system with a third embodiment of the connector fitting in detail.
Figure 4A:
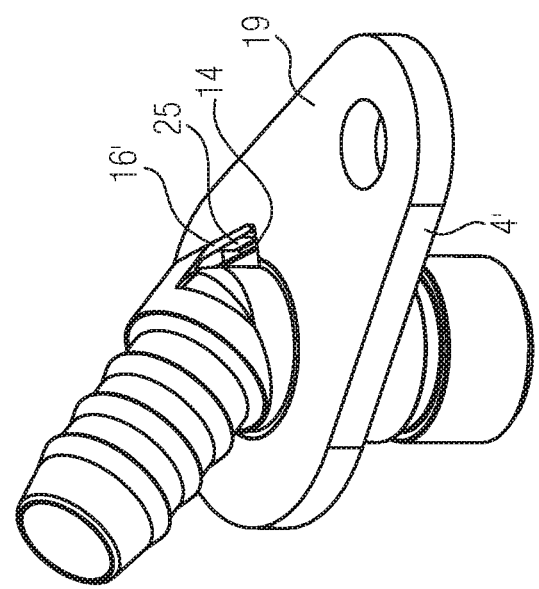

FIGS. 4*a* and 4*b* show a third embodiment of the connector fitting 2. The connector fitting 2" differs from the one shown in FIGS. 3*a* 3*b* by the snap-in tongue 16'. The snap-in tongue 16' comprises a first section 21 and a second section 22. The first section 21 extends from the first end 5 parallel to the first longitudinal axis 8. The second section 22 extends from the first section 21 towards the shoulder 10 in a distance from the middle portion 7.

The second section 22 forms a flexible end 23 adapted to flex towards the middle portion 7. The flexible end comprises a contact area 24 which is adapted to engage with the notch 14 of the fixing plate 4'. The flexible end 23 further comprises a nib 18 located adjacent to the contact area 24. The contact area 24 and an underside of the nib 18 enclose an angle of about 80°.

The second section 22 has a sliding surface 20 on its upper side along which the fixing plate 4' slides when being mounted on the connector fitting 2".

The connector fitting 2" further differs from the one shown in FIGS. 2*a*, 2*b* by a protrusion 13' which extends radially outward from the middle portion 7. Between the protrusion 13' and the snap-in tongue there is a gap 25 which allows the snap-in tongue 16' to flex towards the middle portion 7.

In connection with the present invention it has been found out that the design of the snap-in tongue 16" according to the embodiment of the connector fitting 2" in FIGS. 4*a* and 4*b* works best with a thickness of a fixing plate 4' of 1 mm to 6 mm, preferably of 1 mm to 4 mm. It has been found out that the design of the snap-in tongue 16' facilitates a longer flexing length, starting from the first section 21 until the nib 18, than the snap-in tongue 16 according to FIGS. 2*a* and 2*b*. Consequently the snap-in tongue 16' according to FIGS. 4*a* and 4*b* is also suitable for smaller thicknesses than the snap-in tongue 16 according to FIGS. 2*a* and 2*b*.

In the following the assembly of a fixing plate 4 onto the connector fitting 2 is explained in connection with FIGS. 2*a*. 2*b*.

The fixing plate 4 is positioned relative to the connector fitting 2 such that the bore 12 is coaxially aligned with the first longitudinal axis 8 of the first end 5. The fixing plate 4 is then put over the first end 5 and the adjacent middle portion 7 until the fixing plate 4 comes into contact with the sliding surfaces 20 of the snap-in tongues 16. The bore 12 thereby receives the connector fitting 2 and circumferentially surrounds the middle portion 7 with its inner walls. In order to ensure a proper mount of the fixing plate 4 onto the connector fitting 2 the fixing plate 4 is positioned in a rotational sense relative to the connector fitting 2 such that the notches 14 of the fixing plate 4 are aligned with the protrusions 13 of the connector fitting 2. In this position the fixing plate 4 is positioned almost parallel to the circumferential shoulder 10.

By pushing the fixing plate 4 towards the shoulder 10 the fixing plate 4 slides along the sliding surfaces 20 of the snap-in tongues 16. By that the snap-in tongues 16 are bent towards the rigid bodies 15 of the protrusions 13. When the fixing plate 4 has passed the sliding surfaces 20 the first surface 11 of the fixing plate 4 comes into contact with the shoulder 10. In this position the snap-in tongues 16 flex back away from the rigid bodies 15 radial outwardly until the nibs 18 of the snap-in tongues 16 are engaged with the second surface 19 of the fixing plate 4. The fixing plate 4 is then fixed in longitudinal direction between the nibs 18 and the shoulder 10. Moreover the fixing plate 4 is fixed to the connector fitting 2 in a rotational way because of the form fit between the notches 14 of the fixing plate 4 and the protrusions 13 of the connector fitting 2.

It is understood that the connector systems 2 comprising the connector fitting 2' or the connector fitting 2" respectively as shown in the FIGS. 3*a*, 3*b* and FIGS. 4*a*, 4*b* respectively are assembled the same way as described with reference to the FIGS. 2*a*, 2*b*.

What is claimed is:

1. A connector fitting for a fluid hose in a vehicle comprising:
    a first end for connection to the hose,
    a second end for connection to parts of a fluid system, and
    a middle portion positioned in-between the first end and the second end with the middle portion having a shoulder extending in a circumferential direction of the middle portion for contact with a first surface of a fixing plate when the fixing plate is positioned in such a manner that inner walls of a through-going recess of the fixing plate circumferentially surround the middle portion,
    wherein the connector fitting comprises at least one snap-in tongue with a nib for engaging a second surface of the fixing plate positioned parallel to the first surface such that the fixing plate is fixed in the longitudinal direction of the middle portion between the shoulder and the nib of the snap-in tongue; and the middle portion comprises a protrusion extending perpendicular to the longitudinal direction of the middle portion and positioned adjacent to the shoulder for engaging a corresponding notch in the through-going recess of the fixing plate to rotationally fix the fixing plate relative to the connector fitting, wherein the at least one snap-in tongue is spaced radially outward from the protrusion.

2. The connector fitting according to claim 1, wherein the protrusion comprises a rigid body being fixed to the middle portion, wherein the snap-in tongue is arranged in a direction perpendicular to the longitudinal direction of the middle portion further outward than the rigid body and is adapted to flex towards the rigid body.

3. The connector fitting according to claim 2, the snap-in tongue is aligned with the rigid body in a direction perpendicular to the longitudinal direction of the middle portion.

4. The connector fitting according to claim 1, characterized by two snap-in tongues each comprising a nib.

5. The connector fitting according to claim 4, the two snap-in tongues are located opposite to each other.

6. The connector fitting according to claim 1, wherein the first end extends along a first longitudinal axis which differs from a second longitudinal axis of the middle portion, wherein the first longitudinal axis and the second longitudinal axis enclose an angle of 70° to 150°.

7. A connector system comprising:
a fixing plate for fixing a connector fitting to an engine part or a vehicle part and including a first surface, a second surface positioned parallel to the first surface, and a through-going recess having inner walls and defining a notch and
a connector fitting
comprising:
a first end for connection to a hose,
a second end for connection to parts of a fluid system, and
a middle portion positioned in-between the first end and the second end with the middle portion having a shoulder extending in a circumferential direction of the middle portion for contact with the first surface of the fixing plate when the fixing plate is positioned in such a manner that inner walls of the through-going recess of the fixing plate circumferentially surround the middle portion,
the connector fitting comprises at least one snap-in tongue with a nib for engaging the second surface of the fixing plate positioned parallel to the first surface such that the fixing plate is fixed in the longitudinal direction of the middle portion between the shoulder and the nib of the snap-in tongue, and
the middle portion comprises a protrusion extending perpendicular to the longitudinal direction of the middle portion and positioned adjacent to the shoulder for engaging the corresponding notch in the through-going recess of the fixing plate to rotationally fix the fixing plate relative to the connector fitting, and wherein the at least one snap-in tongue is spaced radially outward from the protrusion.

8. The connector system according to claim 7, wherein the snap-in tongue comprises a first section and a second section, wherein the first section extends from the first end parallel to the first longitudinal axis and the second section extends from the first section towards the shoulder of the middle portion.

9. The connector system according to claim 8, the second section forms a flexible end adapted to flex towards the middle portion.

10. The connector system according to claim 9, wherein the flexible end comprises a contact area for engaging the notch of the fixing plate, and the nib located adjacent to the contact area for engaging the second surface of the fixing plate when the contact area is engaged with the notch.

11. The connector system according to claim 7, wherein the connector fitting is injection molded using a mold which comprises two halves with a mold parting line in between, wherein the snap-in tongue is arranged in such a manner that the mold parting line forms a symmetry plane for the snap-in tongue.

12. The connector system according to claim 7, wherein the middle portion is cylindrical.

13. The connector system according to claim 7, wherein the fixing plate defines the through-going recess formed as a bore which receives the middle portion of the connector fitting.

14. The connector system according to claim 7, wherein the through-going recess corresponds in its form to an outer shape of the middle portion.

15. The connector system according to claim 7, wherein the protrusion comprises a rigid body being fixed to the middle portion, wherein the snap-in tongue is arranged in a direction perpendicular to the longitudinal direction of the middle portion further outward than the rigid body and is adapted to flex towards the rigid body.

16. The connector system according to claim 15, the snap-in tongue is aligned with the rigid body in a direction perpendicular to the longitudinal direction of the middle portion.

17. The connector system according to claim 7, characterized by two snap-in tongues each comprising a nib.

18. The connector system according to claim 17, the two snap-in tongues are located opposite to each other.

19. A connector fitting for a fluid hose in a vehicle comprising:
a first end for connection to the hose,
a second end for connection to parts of a fluid system, and
a middle portion positioned in-between the first end and the second end with the middle portion having a shoulder extending in a circumferential direction of the middle portion for contact with a first surface of a fixing plate when the fixing plate is positioned in such a manner that inner walls of a through-going recess of the fixing plate circumferentially surround the middle portion,
wherein the connector fitting comprises at least one snap-in tongue with a nib for engaging a second surface of the fixing plate positioned parallel to the first surface such that the fixing plate is fixed in the longitudinal direction of the middle portion between the shoulder and the nib of the snap-in tongue, and wherein the snap-in tongue comprises a first section and a second section, wherein the first section extends from the first end parallel to the first longitudinal axis and the second section extends from the first section towards the shoulder of the middle portion and the nib being at an end of the second section of the snap-in tongue; and
the middle portion comprises a protrusion extending perpendicular to the longitudinal direction of the middle portion and positioned adjacent to the shoulder for engaging a corresponding notch in the through-going recess of the fixing plate to rotationally fix the fixing plate relative to the connector fitting, and wherein the at least one snap-in tongue is spaced radially outward from the protrusion.

* * * * *